Patented Jan. 13, 1953

2,625,483

UNITED STATES PATENT OFFICE 2,625,483

PROCESS OF PRODUCING MODIFIED LARD

Karl F. Mattil, Chicago, and De Witte Nelson, Elmhurst, Ill., assignors to Swift & Company, Chicago, Ill., a corporation of Illinois No Drawing. Application September 14, 1950, Serial No. 184,914

5 Claims. (Cl. 99—118)

The present invention relates to the treatment of lard, and more particularly to the production of lard and lard-containing products having improved properties.

Lard, commercially the most important triglyceride material from an animal source, is fat obtained from the fatty tissue of hogs by a heat, solvent or enzyme treatment of the fatty tissue. The most common method of obtaining lard from the fatty tissue of hogs is the so-called wet or steam rendering treatment in which the fat is separated from the tissue by means of pressure with hot water or steam to give what is known as prime steam lard. Another common method of obtaining lard is by the dry rendering process in which fat is removed from the fatty tissue by means of heat alone. The latter method of obtaining lard includes the kettle rendering process in which the fat is melted in a hot water or a steam jacketed kettle. Other methods of obtaining lard, such as solvent and enzymatic treatment of fatty animal tissue, while not widely used on a commercial scale, are potentially important sources of lard.

After recovering the lard from the fatty tissue, the lard is generally treated to impart certain desired characteristics thereto. Thus, the lard may be settled, bleached, refined, washed, filtered, and deodorized to yield a substantially odorless and tasteless product.

Lard is often further treated to impart thereto the desired degree of plasticity, as when the lard is to be used in baked products. This desired plasticity may be obtained by a process which includes compounding therewith hardened lard or an hydrogenated vegetable fat, incorporating air therein and chilling. Of particular importance in the texturizing process is the chilling step. This chilling of the lard may be accomplished by means of chill rolls or an internal chilling machine. In the former method molten fat is picked up on the surface of the internally chilled rotating rolls and then subsequently scraped therefrom and further worked to give the lard a uniform plastic consistency. Chilling by means of an internal chilling machine is accomplished by passing molten fat through a series of vertical or horizontal units where the fat is supercooled and allowed to solidify while being rapidly worked. The lard product treated in the foregoing manner is generally employed as a shortening. Heretofore the plasticity of the final product has depended to a great extent on the nature of the foregoing chilling operation, and the final plasticity has been highly sensitive to the conditions of the chilling step. For this reason the operating conditions in the chilling step have necessarily been very critical and required very careful control.

Another important characteristic of a shortening is its creaming ability. This creaming ability is a measure of the amount of air that can be incorporated into a batter during the mixing operation. The greater the amount of air absorbed and retained by the fat, the greater the leavening effect of the shortening. Thus, for example, the volume of a cake may be increased by the use of shortening possessing superior creaming properties. The creaming ability of a shortening may be determined by measuring the density of the batter or dough, or by measuring the volume of a cake in which the shortening has been incorporated. A high specific gravity indicates a relatively dense mass with only a small amount of incorporated air, while a low specific gravity indicates a light, fluffy mass having a large amount of air incorporated therein. In general, the value of a shortening increases with its ability to absorb air.

Still another very important characteristic of a shortening is its appearance, particularly after being held at the elevated temperatures frequently encountered during distribution and sale of the product. Solidified animal triglyceride material such as lard and lard-containing products frequently have a dull, waxy, and Vaseline-like appearance which becomes progressively more pronounced the longer the product is held. The appearance of lard and lard-containing products is generally considered much inferior to the appearance of vegetable shortenings which have been held under comparable storage conditions, since vegetable shortenings possess a smooth, satiny luster which is retained even after prolonged storage.

While lard has unsurpassed shortening properties, the vegetable shortenings are generally considered to have superior creaming and emulsifying properties as well as improved appearance and storing properties. One of the principal causes for the inferiority of the appearance, storing properties, creaming ability, and emulsifying properties of the lard is the needle-like, crystal formation which the lard glyceride molecules assume upon solidifying and which continue to grow during storage. The long, needle-like crystals impart to lard and lard-containing products the waxy, rubber-like texture or grainyness which becomes much more pronounced and highly objectionable on standing at the relatively high temperatures generally encountered when distributing through normal commercial channels. Although it has been found possible to temporarily alter the crystallization pattern of lard by packaging while holding the lard at a carefully controlled, relatively low temperature, the lard crystals soon revert to their natural long, needle-like form when the lard is allowed to stand at room temperature. For this reason the foregoing temperature treatment during the packaging of lard is of no practical value when applied to lard which is to be distributed through normal commercial channels.

In order to overcome the foregoing objectionable properties of lard and lard-containing products which have been found to be attributable to the normal crystallization habit of lard, it is an essential object of the present invention to permanently alter the normal crystallization habit of lard so as to prevent the formation of large, needle-like crystals during crystallization and subsequent storage.

An additional object within the broad scope of the invention is to provide lard in which the heat of crystallization normally associated with the said lard is substantially altered.

Another object of the invention is to provide a product containing lard having improved plastic properties, including improved pliability and workability.

An additional object of the invention is to provide a lard product having improved appearance characterized by a smooth velvety sheen.

A further object of the invention is to provide a lard product having properties which equal or excel those of vegetable shortening while maintaining the superior shortening characteristic of lard.

Still another object of the invention is to provide a lard product having improved baking qualities, including enhanced emulsifying and creaming properties.

A still further object of the invention is to provide a satisfactory lard product which may be texturized with a greater degree of flexibility in the operating conditions.

Still further objects of the invention will be apparent from the following description and claims.

In accordance with the present invention it is proposed to subject lard to a very moderate temperature treatment in the presence of a substance capable of changing the crystallization properties thereof under conditions which do not cause an appreciable change in the melting point of the glyceride material or a significant change in the distribution of the several types of triglyceride molecules in the fatty material being treated. The reaction which modifies the triglyceride molecules is highly complex and the mechanism is not completely understood. It has been observed, however, that the crystal habit and the heat of crystallization of the triglyceride molecules of lard are very significantly affected. And, since the substances capable of modifying the crystallization properties of triglyceride molecules do not become part of the crystal modified triglyceride molecules, the reaction appears to be catalytic. Therefore, the effective substances are herein referred to as crystal modifying catalysts.

Without limiting the invention to any particular theory or mechanism, it is believed that a more complete understanding of the present invention and of the lard crystal modification reaction will be obtained by considering the reaction mechanism which appears to be supported by the experimental evidence. As only the higher melting point components of lard are crystalline at temperatures of about 68° F. and above, only these higher melting components are believed significant when studying the mechanism which produces the change in the X-ray diffraction pattern of lard and the changes in physical properties coincident therewith. Thus, the trisaturated and disaturated lard triglyceride molecules are considered of primary importance. As reported in the literature and as determined by experimental work, the major proportion (86 per cent) of the normal crystalline components of natural lard consists of monounsaturated-disaturated triglycerides, such as beta-oleo-palmitostearin, and in their natural state are symmetrical with regard to the unsaturated component (Hildich, The Chemical Composition of Natural Fats, 1941 edition, p. 248, ibid). It has also repeatedly been reported in the literature that these symmetrical monounsaturated-disaturated triglycerides, such as beta-oleo-palmitostearin, form beta-type crystals as their most stable and normal form. However, the normal and stable form of these monounsaturated-disaturated triglycerides having their unsaturated acid groups in a position other than the beta position and thereby having an unsymmetrical configuration with respect to the unsaturated acid, is the beta prime crystal form, the normal crystal form of hydrogenated vegetable oil shortening. Thus, it has been found that when the higher melting point fraction of a triglyceride material is comprised of a major proportion of symmetrical beta-forming triglycerides, such as beta-oleo-palmitostearin, the material will crystallize in the beta form, whereas when this triglyceride material has a major proportion of its higher melting point constituents in the unsymmetrical form, the material will crystallize in the beta prime form, the normal crystal form of hydrogenated vegetable oil shortening, and assumes the appearance and desirable properties associated with hydrogenated vegetable oil shortening. It is therefore believed that the crystal modification of lard is obtained as a result of transforming and isomerizing the naturally occurring symmetrical monounsaturated-disaturated lard triglycerides which comprise the major proportion of the higher melting point constituents of lard into the unsymmetrical isomers which have as their most stable form the beta prime crystal form. The foregoing has been supported by the observations that such isomerization has been obtained without any interesterification taking place whatsoever and, furthermore, when lard is treated in accordance with the hereindisclosed crystal modification process it has been found that there is no appreciable change in the percentage of monounsaturated-disaturated triglycerides of lard as a result of the crystal modification treatment (e. g., 26.4 per cent before modification and 26.8 per cent after modification).

Heretofore when liquefied glyceride fatty material has been treated with certain catalytic agents, the conditions which have heretofore been employed cause a molecular redistribution of the fatty acid groups between the triglyceride molecules and result in a change in the composition of the glyceride molecules. This redistribution has been termed interesterification or transesterification. The final result of the interesterification is a random distribution of the fatty acid molecules among the glyceride molecules. The interesterification is evidenced by an appreciable change in the melting point of the treated product and in the quantity of the triglyceride material which crystallizes from a solvent for the glyceride product at a specific temperature. For example, when cottonseed oil is interesterified with any of the recognized interesterification catalysts and under conditions employed heretofore, the melting point and consistency of the glyceride material is significantly altered.

In marked contrast with the previous method of catalytically treating triglyceride material, the herein-disclosed crystal modifying treatment does not cause an appreciable change in the melting point of the material, a change in the chemical composition and structure of the fatty acid groups of the glyceride molecules, nor an appreciable change in the proportions of the several types of glyceride molecules in the material being treated. Moreover, the herein-disclosed crystal modification will be entirely completed within a few minutes under moderate temperature conditions (e. g., below 200° C.) when sufficient crystal modifying catalyst is employed. There appears to be no significant amount of interesterification of the glyceride molecules under the mild temperature conditions and relatively short heat treatment employed in the present invention as measured by the increase of trisaturated glycerides, although a small degree of interesterification has been observed to occur during the crystal modifying treatment and to continue after crystal modification has been completed.

More particularly the present invention contemplates heating lard at relatively moderate temperatures above the melting point of the highest melting point components of said glyceride material in the presence of a crystal modifying catalyst for a period sufficient to substantially alter the normal crystallization habits of the triglyceride molecules but without causing any significant amount of interesterification of the triglyceride molecules.

The catalyst may be added in dry form, in the form of solution, suspension, or by means of a solid carrier, such as kieselguhr. The catalyst may be added in the form of a saturated solution or slurry, or a dilute solution, the amount to be added being calculated on the dry basis. It is not advantageous, however, to add the crystal modifying material in too dilute a form, since greater dilution entails a greater amount of solvent to be removed.

It has been found that a large number of organic compositions are effective in accomplishing the purpose of the present invention, including both alkaline reacting compositions and acidic reacting compositions. Among the organic compositions which have been found most effective as catalysts in modifying the crystal form of lard are the organic salts, such as the alkoxides, comprising the alcoholates of mono, di, and polyhydroxy alcohols. Of particular utility in the present invention are the alcoholates of the lower molecular weight mono and di-hydroxy alcohols having about 8 carbon atoms per molecule or less in which the hydrogen atom of a hydroxy group of the alcohol is replaced by an alkali metal, although the polyvalent metal alcoholates and alkoxides are also effective. The alcoholates of the higher mono and di-hydric alcohols, the trihydric alcohols, and other polyhydric alcohols are also useful in effecting crystal modification but require somewhat higher temperatures and longer period of treatment than do the salts of the lower mono and di-hydroxy alcohols, although the said temperatures and longer periods are substantially below those normally employed for the single phase interesterification of fatty glyceride materials. By way of example, crystal modified lard having the improved properties herein described has been obtained upon heating lard with a crystal modifying catalyst, such as sodium methylate, sodium glycolate, sodium propylene glycolate, sodium salt of benzyl alcohol, sodium octylate, sodium laurylate; the potassium and lithium salts of each of the foregoing alcoholates; magnesium methoxide, calcium glycerinate, sodium cetylate, and sodium mannitolate; and other compositions within the classes illustrated and suggested by the foregoing compositions.

In contrast with the previous methods of treating triglyceride materials with catalytic agents, the present invention does not employ or require the use of high temperatures for prolonged periods of heating. The lower limit of the effective temperature range is the temperature just above that at which the highest melting point constituent of the lard being treated will begin to crystallize from the liquefied fatty material, since removal of the higher melting point constituents is undesirable. This lower temperature limit is, therefore, generally about 50° C. At a temperature of about 130° C. when, for example, sodium methoxide is employed as the crystal modifying catalyst, the modifying reaction appears somewhat less complete than when conducted at slightly lower temperatures. Treatment of the fatty material with the herein-disclosed crystal modifying catalysts at higher temperatures substantially about 200° C. is considered undesirable. The actual temperature limits within which such satisfactory treatment can be obtained in accordance with the present invention will vary somewhat with the particular catalyst employed. But in each instance there is a lower and upper temperature limit outside of which crystal modification as described herein takes place at a relatively very slow rate and thereby making the treatment commercially unsatisfactory, even though interesterification may proceed normally at such temperatures. For example, the methylates, ethylates, glycol salts, propylene glycol salts, and benzyl alcohol salts all have about the same effective temperature range, and crystal modifying treatment with the foregoing catalysts is considered commercially feasible within a temperature range of about 60° C. to 120° C. and preferably within a temperature range of about 70° C. to 100° C. The most effective temperature which should be employed for a particular catalyst within the herein-disclosed class of catalysts may be readily determined by one skilled in the art in accordance with the present disclosure and the characteristics of the modified glyceride material described herein.

The time of treatment required to produce crystal modification also varies somewhat, depending upon the temperature, the concentration and specific catalysts employed, and upon the composition and purity of the lard being modified. Within the effective temperature range, it can generally be said that at the lower temperatures, the speed of reaction is somewhat slower. At a given temperature within the effective temperature range, when the concentration of the catalyst is adequate, the crystal modification proceeds very rapidly and almost instantaneously to completion and the addition of more catalyst does not appear to increase the rate of reaction. Thus, when sodium methylate was used as the crystal modifying catalyst, the lard was completely crystal modified by the time all the catalyst was added which was within 3 to 5 minutes at a temperature of about 96° C., with the catalyst concentration being 0.35 to 0.50 per cent based on the weight of the fatty material. At a lower temperature around 82° C. with a concentration of sodium methoxide catalyst of .3 per cent, the time of treatment may be somewhat longer, but crystal modification will generally be complete within about 30 minutes. Where speed of processing is of little importance and where there is a need to economize on the amount of catalyst or pretreatment of the lard, the reaction time may be extended somewhat. The correlation between time of treatment, temperature, and concentration of catalyst will be more apparent from the specific examples to follow.

The effective concentration of the particular catalyst also depends upon several variable factors. These variables include the amount of moisture and the amount of free fatty acid in the lard being treated, and to a lesser extent on the condition of the fatty material being treated. In general, the higher the moisture and free fatty acid content, the greater is the amount of catalyst required. It has been found that each part of free fatty acid in the triglyceride material inactivates about one-fifth its weight of sodium methylate, and that each part of moisture inactivates about three times its weight of the sodium methylate catalyst. With sodium methylate as the catalyst, for example, it has been found that the minimum quantity which may be effectively employed in commercial practice is about 0.2 per cent by weight of the refined, substantially dry animal fat, although smaller amounts may be employed where conditions may be more carefully controlled. When other catalysts are employed they should be added in sufficient quantities to provide about the same molar equivalent as the per cent sodium methylate. Concentrations of the catalyst of about 2 per cent and above may be used without interfering with the crystal modification treatment, although a concentration between 0.25 and 0.50 per cent based on the weight of the lard being treated is normally sufficient and for economic reasons is preferred.

The lard may be heated in the presence of the catalyst at any stage of processing, and the beneficial results of the crystal modifying treatment is not impaired by subsequent processing, such as deodorization or hydrogenation. It is also unnecessary to hold the crystal modified product at any particular temperature. It is preferred, however, to treat the lard with the catalyst prior to the refining thereof so that the catalyst together with the free fatty acids may be removed in one step. Where it is desired to omit the treatments generally employed to impart certain desired characteristics to lard, the rendered lard may advantageously be heated in the presence of the herein-disclosed catalysts to produce crystal modified lard. It is advisable in each instance to deodorize the crystal modified lard after treatment with the catalyst in order to insure complete removal of any alcohol which might have been produced during removal of the catalyst.

The following specific examples should be considered as merely illustrative of the herein-disclosed process and resulting product and should in no way be construed to limit the invention to the particular materials or conditions disclosed therein:

EXAMPLE I 2,094 pounds of prime steam lard having a free fatty acid content of 0.44 per cent expressed as oleic acid were melted and mixed with diatomaceous earth and then heated to about 104° C. for about 5 minutes to remove substantially all moisture from the lard. The substantially dry lard was then filtered and contained 0.02 per cent moisture. The dry lard was then placed in an open steam jacketed kettle and 0.35 per cent sodium methoxide catalyst based on the weight of the lard was added. The temperature of the lard in the kettle was maintained at 96° C. while stirring constantly. After 25 minutes at the above temperature, the heating was discontinued and the lard cooled to about 65° C. About 100 pounds of water were then added in order to hydrate the catalyst. After allowing the foots to settle, the lard was pumped from the kettle and a yield of 96.2 per cent of the original lard was obtained as crystal modified lard. The modified lard was mixed with bleaching clay to decolorize the lard filtered through appropriate filter presses. If the lard is not to be formulated into a compounded shortening which will be deodorized, it should be deodorized to remove traces of catalyst and other volatile matter. The final crystal modified lard had a free fatty acid content expressed as oleic acid of 0.04 per cent and a melting point of 42° C. compared with a melting point of 44° C. for the original lard. The crystal modified lard was softer, more plastic, and had a much lower consistency at room temperature, although the melting point had not changed appreciably.

When the crystal modified lard was dissolved in a solvent such as petroleum ether and cooled to crystallize therefrom fractions of the higher melting point glyceride material, there was no appreciable difference in the weight of the fractions of the triglycerides precipitated from the crystal modified sample as compared with control sample of unmodified lard, thereby indicating that there had been no appreciable change in the composition of the glyceride molecules of the lard. For example, when 100 grams of the above crystal modified lard was dissolved in 1,000 grams of petroleum ether and stored for 5 days at 44° F., the solid triglyceride material crystallized from the solvent weighed 3.7 grams as compared with the 3.5 grams of triglyceride material crystallized from 100 grams of the unmodified lard dissolved in the same amount of petroleum ether under conditions identical to those employed when crystallizing the modified lard. It is therefore evident that there is no significant change in the proportion of the higher melting point constituents present in the crystal modified lard after treatment in accordance with the herein-disclosed process.

When the crystal modified lard was chilled and texturized by being rapidly agitated, the crystal modified lard cooled at a uniform rate in marked contrast with the irregular rate of cooling of an untreated sample of lard. Also, when the crystal modified lard was texturized, it rapidly occluded air throughout its mass, whereas the unmodified lard exhibited no pronounced tendency to occlude air when treated in a similar manner.

To test the cake-baking properties of a shortening having crystal modified lard as the basic ingredient, 85 per cent crystal modified lard was formulated to a shortening consistency by admixing therewith 15 per cent hydrogenated fat, thoroughly deodorized, and the usual small percentage of a commercial monoglyceride preparation was added in accordance with the conventional method of preparing a compounded shortening. The foregoing mixture was then passed through a standard internal chilling and texturizing machine and filled into three-pound containers in the conventional manner of packaging compounded shortening.

After suitable tempering, the above shortening containing crystal modified lard was used in baking a standard pound cake which possessed a volume of 1525 cc., whereas the pound cake made from the control shortening containing unmodified lard in the same proportion exhibited a volume of 1495 cc.

The all animal shortenings made from the crystal modified lard and the animal-vegetable blended shortenings containing a substantial amount of crystal modified lard had the characteristic velvety sheen, smooth texture, and creamy appearance commonly associated with all vegetable shortenings.

Tins of the control shortening containing unmodified lard and other tins of shortening containing the foregoing crystal modified lard were stored for five days at 100° F. The control product rapidly lost its original plastic appearance and texture while the shortening containing crystal modified lard retained its velvety sheen and smooth texture. The pound cake made from the stored shortening containing crystal modified lard had a very satisfactory texture and a very satisfactory volume of 1545 cc., while the pound cake made from the control shortening containing unmodified lard was coarse in texture and had a volume of only 1340 cc. which was very much less than the volume of the pound cake made from the same shortening before storing. It is evident that the shortening containing the crystal modified lard was not impaired at all during the high temperature holding period, but the control sample of shortening had a less desirable appearance and could no longer produce a pound cake having a satisfactory texture or volume.

EXAMPLE II 2,415 pounds of prime steam lard having a free fatty acid content of .48 per cent expressed as oleic acid were melted and mixed with diatomaceous earth and then heated to about 104° C. for about 5 minutes to remove substantially all moisture from the lard. The substantially dry lard was then filtered and placed in a closed steam jacketed converter. The lard was heated to 96° C. and 12.5 pounds (.5 per cent) sodium methoxide catalyst were added to the dry lard. A pressure of 1 to 3 pounds hydrogen was maintained in the converter. After 3 to 5 minutes, at a temperature of approximately 96° C., the heating was discontinued and the lard allowed to cool to about 65° C. About 125 pounds of water were then added to the reaction mixture in order to hydrate the foots formed during the reaction and hydrolize the methoxide catalyst. After allowing the foots to settle, the lard was pumped from the kettle and a yield of 97.1 per cent of the original lard was obtained as crystal modified lard. The modified lard was mixed with bleaching clay, filtered to finally decolorize the lard, and deodorized. The final crystal modified lard had a free fatty acid content of 0.11 expressed as oleic acid and a melting point of 43° F. as compared with a melting point of 44.5° F. for the original unmodified lard. The crystal modified lard was softer, more plastic, and had a lower consistency at room temperature than the unmodified lard.

The crystal modified lard was texturized by chilling and agitating until plastic. It was evident that a large volume of air was occluded in the crystal modified lard during the texturizing operation and that the modified lard cooled at a uniform rate. When a sample of crystal modified lard into which air had been incorporated was allowed to stand at room temperature, it exhibited a remarkable tendency to retain the occluded air. Even when heated on a steam bath, the sample retained the occluded air at the elevated temperature. This property of the crystal modified lard of retaining large volumes of air, even at elevated temperatures, explains the ability of crystal modified lard to produce pound cakes having a substantially increased volume, since the ability of a shortening to retain air at elevated temperatures is largely responsible for producing good cake volume.

Shortenings made from crystal modified lard had the characteristic velvety sheen, smooth texture, and creamy appearance of an all vegetable shortening and precipitated substantially the same amount of triglyceride material from petroleum ether.

EXAMPLE III 2,336 pounds of prime steam lard having a free fatty acid content of about 0.45 per cent expressed as oleic acid were melted and mixed with diatomaceous earth at a temperature of about 104° C. for about 5 minutes to remove substantially all moisture from the lard. The substantially dry lard was filtered and pumped into a closed steam-jacketed converter and heated to a temperature of about 96° C. To the dry lard 0.3 per cent sodium methoxide catalyst was added and heated for approximately 10 minutes under a nitrogen pressure of about 3 pounds. In the absence of any indication that a crystal modification reaction had taken place, an additional quantity of sodium methoxide catalyst was added to increase the total per cent catalyst to 0.35 per cent, and heating was continued for an additional five-minute period. At the end of this five-minute period the reaction mixture had turned a reddish-brown color in appearance and heating was discontinued. The reaction mixture was allowed to cool to a temperature of about 65° C. and 75 pounds of water were added to hydrate the foots formed during the reaction. After allowing the foots to settle, the lard was removed from the converter and a yield of 97.3 per cent of the original lard was obtained as crystal modified lard. The lard was treated with bleaching clay and filtered to decolorize the lard.

Upon chilling the lard and texturizing, the characteristic velvety sheen was evident and a smooth plastic product having a low specific gravity was obtained which was in marked contrast to the heavy, waxy, and Vaseline-like appearance and texture of the control sample of unmodified lard treated in a similar manner. Also, when temperature readings of samples of the crystal modified lard and unmodified lard were taken while being chilled either before or after compounding and the readings plotted on temperature-time coordinates, uniform cooling curves were obtained for the samples containing crystal modified lard, whereas there was a noticeable irregularity in the cooling curves of the unmodified lard samples.

The above crystal modified lard was also incorporated in an all-hydrogenated animal-vegetable shortening having mono- and di-glycerides added in the usual amounts to produce the conventional compounded shortening. A pound cake batter made from the shortening containing crystal modified lard had a specific gravity of 0.725 and this batter produced a pound cake having a volume of 1555 cc. A typical all hydrogenated animal-vegetable shortening containing monoglycerides made with unmodified lard produced a pound cake batter having a specific gravity of 0.730 and a pound cake having a volume of 1480 cc. An all hydrogenated vegetable shortening containing monoglycerides produced a pound cake batter having a specific gravity of 0.740 and a pound cake volume of 1475 cc.

After holding the foregoing all hydrogenated animal-vegetable shortening and a control shortening made from unmodified lard at 75° F. for 4 days, the Bloom consistometer readings were 46 and 44 respectively. These samples were then held for 7 days at 50° F. and tested for consistency. It was found that the Bloom consistometer reading for the crystal modified shortening was 163, whereas the reading for the control shortening was 190. The foregoing consistency data shows that the crystal modified lard shortening resists hardening on storing much better than shortening made with unmodified lard and has a softer consistency after standing than shortening made with unmodified lard.

EXAMPLE IV 2,180 pounds of prime steam lard were dried and decolorized by mixing with diatomaceous earth at a temperature above 100° C. and filtering. The dry lard was placed in a steam jacketed kettle, heated to 93° C., and 0.3 per cent of sodium methoxide catalyst was added. After heating for 20 minutes, the lard was allowed to cool, and the foots were hydrated with 75 pounds of water. The foots were allowed to settle and the refined crystal modified lard withdrawn from the kettle. The modified lard was bleached by admixing with bleaching clay, filtered to yield 97.5 per cent crystal modified lard, and deodorized.

The lard treated in the foregoing manner was found to possess the characteristic appearance and exhibited the properties of crystal modified lard, such as occluding large amounts of air when texturized and precipitating substantially the same amount of triglyceride material from petroleum ether.

EXAMPLE V 2,514 pounds of prime steam lard were admixed with diatomaceous earth and heated above 100° C. to remove substantially all the moisture therefrom. After filtering, the dry lard was placed in a steam jacketed kettle, heated to 82° C. and 0.3 per cent sodium methoxide catalyst was added. At the end of 20 minutes' heating at 82° C., a sample of the lard was hydrated and the foots separated from the lard. This lard, after bleaching with clay, was passed through a texturizing apparatus and failed to occlude any substantial amount of air over and above that of the control sample. After an additional 10 minutes of heating at 82° C., the lard was hydrated, separated from the foots, and bleached in the above-mentioned manner. A sample of this lard was passed through the texturizing apparatus, and the characteristic velvety sheen and physical properties of crystal modified lard, such a occluding a large volume of air, were clearly evident.

It thus became apparent that when lard is heated with an insufficient amount of the sodium methoxide catalyst, no appreciable crystal modification takes place in the customary time period. If the period of heating is extended slightly, however, it will often be possible to crystal modify the lard without adding more catalyst.

EXAMPLE VI 2,280 pounds of prime steam lard were melted and admixed with diatomaceous earth to substantially dry and decolorize the lard. After filtering, the dry lard was placed in a steam jacketed kettle and heated to 80° C. To the heated lard 0.22 per cent sodium methoxide catalyst was added. Only after heating the lard for a period of 90 minutes did the lard exhibit the hereindescribed characteristic properties of crystal modified lard.

The foregoing is illustrative of instances wherein insufficient catalyst is employed. In such instances crystal modification can frequently be obtained by extending the heating period as above. In general, however, it should not require more than approximately 10 to 25 minutes at the most to completely crystal modify lard when the unmodified lard of regular commercial quality is properly prepared in accordance with the hereindescribed procedure and when the correct amount of catalyst is used.

EXAMPLE VII 2,180 pounds of prime steam lard having a low free fatty acid content were thoroughly dried by admixing the diatomaceous earth and heating above 100° C. for several minutes. After filtering the dry lard was placed in the steam jacketed kettle and heated to 81° C. To the dried lard 0.275 per cent sodium methoxide catalyst was added, and heating was discontinued as soon as the addition of the catalyst was completed and within 5 minutes of the time that the first catalyst was added The sample of lard after being separated from the foots, bleached, and deodorized, exhibited the described characteristic appearance and properties of crystal modified lard and was in every respect completely crystal modified.

The foregoing example illustrates that even at relatively low temperatures and with a small per cent of catalyst used, it is possible to completely crystal modify during a very short period of time if the lard has been thoroughly dried and a sufficient quantity of catalyst is employed.

EXAMPLE VIII

In the refinery plant 68,000 pounds of prime steam lard having a free fatty acid content of 0.38 per cent expressed as oleic acid were melted and mixed with diatomaceous earth and then heated to about 104° C. for several minutes to remove substantially all moisture from the lard. After filtering the substantially dry lard was placed in a heated, open refining tank and 300 pounds of sodium methoxide catalyst were added to the lard having a temperature of 96° C. After heating for about 15 minutes at a temperature of 96° C., the lard was allowed to cool to about 65° C. and about 3400 pounds of water were added to hydrate the foots formed during the reaction. After allowing the foots to settle, the lard was pumped from the tank and a yield of about 95.5 per cent of the original lard was obtained as crystal modified lard. The crystal modified lard was mixed with bleaching clay and filtered to finally decolorize. The crystal modified lard had a free fatty acid content of 0.05 per cent expressed as oleic acid, and a melting point of 42° C. as compared with a melting point of 43.5° C. for the original unmodified lard. The iodine number of the modified lard was 77.6 as compared with 77.9 for the unmodified lard.

Samples of the crystal modified lard when texturized had a smooth velvety appearance, exhibited good plasticity, and had a lower consistency at room temperature than unmodified lard similarly texturized.

The crystal modified lard produced by the foregoing treatment was made into several shortening products. The all hydrogenated vegetable-animal shortening without monoglycerides and containing the crystal modified lard gave a wet cream test of 0.435 and a pound cake having a volume of 1,460 cc. The control shortening containing unmodified lard gave a wet cream test of 0.500 and a pound cake having a volume of 1,400 cc. A quality all hydrogenated vegetable shortening gave a wet cream test of 0.440 and a pound cake volume of 1,435 cc.

The all hydrogenated vegetable-animal shortening having mono and diglycerides added thereto in the standard amounts produced a cake batter having a specific gravity of 0.755 and a pound cake having a volume of 1,570 cc., whereas the control shortening containing unmodified lard gave a pound cake batter having a specific gravity of 0.750 and a pound cake having a volume of 1,495 cc. The specific gravity of a pound cake batter made with a quality all hydrogenated vegetable shortening containing monoglycerides was 0.760 and a pound cake volume of 1,500 cc.

Similarly, improved comparative results were obtained when crystal modified lard was made into the standard all hydrogenated animal shortening, animal-vegetable blended shortening, and animal-vegetable shortening containing added mono and diglycerides.

EXAMPLE IX

In the refinery plant 68,090 pounds of prime steam lard were melted and mixed with diatomaceous earth in order to substantially remove all moisture from the lard. After filtering, the lard was found to have a moisture content of 0.01 per cent. The substantially dry lard was pumped into an open refining tank and heated to a temperature of 85° C. To the dried, heated lard were added 200 pounds of sodium methoxide catalyst and heating at the said temperature was continued for 13 minutes. The lard was then cooled to about 65° C. and 2,000 pounds of water were added to deactivate the catalyst and hydrate the foots. After the foots had settled to the bottom of the refining tank, the modified lard was pumped off and a yield of 97.6 per cent crystal modified lard was obtained. The crystal modified lard was mixed with bleaching clay and filtered to completely decolorize the lard.

The crystal modified lard produced by the foregoing treatment has the characteristic appearance and properties of crystal modified lard described in the preceding examples. For example, the modified lard had the property of occuluding large volumes of air when texturized and retained said air even when heated, and precipitated substantially the same amount of triglyceride material from petroleum ether on cooling as did the unmodified lard.

The crystal modified lard was made into various shortening products in the conventional manner and held for 8 weeks at 95° F. and then incorporated in the standard pound cake batter and baked in the conventional manner. The all hydrogenated vegetable-animal shortening containing crystal modified lard made in the conventional manner had a Bloom consistency reading of 25 at 95° F. and produced a pound cake having a volume of 1,390 cc., whereas the control shortening containing the unmodified lard had a Bloom consistency reading of 32 at 95° C. and produced a pound cake having a volume of 1,250 cc. Likewise, the all hydrogenated vegetable-animal shortening having added mono and diglycerides therein, which was made from the crystal modified lard and held for 8 weeks at 95° F. had a consistency of 25 and produced a pound cake having a volume of 1,420 cc., whereas the control shortening made from unmodified lard obtained from the same original batch of lard and held under identical conditions had a consistency of 32 and produced a pound cake having a volume of 1,255 cc. It is evident from the foregoing that shortening containing the crystal modified lard withstood changes in its crystal structure as a result of prolonged holding at the elevated temperature much better than did the shortening made from the regular unmodified lard, since the lower consistency readings show that the shortening has lost less of the originally incorporated air and has fewer large grainy crystals in the mass thereof.

Of equal importance from the commercial standpoint was the marked contrast in the appearance of the shortenings made from the modified and unmodified lards after being held for the 8-week period at 95° F. While the shortening made from unmodified lard had a dull, grayish appearance and a crinkly or brittle texture, the shortening made from the crystal modified lard had retained substantially all its original velvety sheen and smooth texture, which is characteristic of the original texturized product.

EXAMPLE X 1,500 grams of prime steam lard were dried by heating at 110° C. and filtered through diatomaceous earth. The lard containing about 0.02 per cent moisture was heated to 96° C. and 0.40 per cent sodium methoxide catalyst was admixed with the lard under an atmosphere of nitrogen. After heating for 5 minutes at a temperature of 96° C., heating was discontinued and the settled, refined lard exhibited the characteristic improved appearance and properties of crystal modified lard.

EXAMPLE XI 1,500 grams of the same lot of prime steam lard as used in Example X were alkali refined, settled, and the refined lard was decanted to separate the foots therefrom. This refined lard was heated to 110° C. to remove substantially all traces of moisture and filtered through diatomaceous earth. This lard was further heated under a vacuum with agitation at a temperature of 130° C. to completely dry the lard. The refined and dry lard was then heated at 96° C. and a 0.25 per cent sodium methoxide catalyst was added, and heating was continued for 5 to 7 minutes. The lard so treated and separated from the foots exhibited the characteristic improved appearance and properties of crystal modified lard which have been described heretofore.

It will be evident from preceding Examples X and XI when compared with the pilot plant and plant production conditions that laboratory results may be transferred directly to pilot plant and plant productions.

Examples X and XI also clearly show the effects which the presence of free fatty acid and moisture have on the amount of catalyst required to crystal modify lard. Thus, in Example X the free fatty acid was not removed before the addition of sodium methoxide catalyst. And, while reasonable steps were taken to remove a large part of the moisture, there was still moisture present. In Example XI where the lard was alkali refined to remove all free fatty acids, and was heated to 130° C. with agitation under a vacuum to remove all the moisture from the lard, it will be observed that a saving amounting to approximately 0.15 per cent catalyst was possible. While it may not be considered commercially feasible to alkali refine lard before crystal modifying or to employ a vacuum to completely dehydrate the lard, it is significant to observe the effects which the free fatty acid and moisture have upon the amount of catalyst required, and reasonable precaution should be taken to limit the amounts of free fatty acid and moisture in the original lard.

In order to test the effectiveness of additional crystal modifying catalyst, the following laboratory experiments were performed:

EXAMPLE XII 1,500 grams of kettle-rendered lard were heated to 110° C. to remove substantially all moisture therefrom. To the substantially dry lard heated to a temperature of 70–75° C. was added 1.2 per cent of lithium methoxide dissolved in ethyl alcohol as a solvent therefor, and the heating continued for 10 minutes. At the end of this 10-minute heating period the lard exhibited the characteristic appearance and properties of crystal modified lard.

EXAMPLE XIII 1,500 grams of kettle-rendered lard were heated to about 110° C. for a few minutes to remove substantially all moisture, and when the lard had a temperature of 75° C., lithium methoxide was added to produce a concentration of 0.64 per cent therein, and heating at 75° C. was continued for 25 minutes. At the end of the heating period, the lard exhibited the physical properties and the characteristic appearance of crystal modified lard.

EXAMPLE XIV 1,500 grams of prime steam lard were heated to 110° C. to remove substantially all moisture and filtered through diatomaceous earth. To the lard having a temperature of 95° C. was added 0.50 per cent sodium glycolate. After heating at a temperature of 95° C. for 30 minutes, the lard exhibited the characteristic appearance and properties of crystal modified lard.

EXAMPLE XV 1,500 grams of lard were dried and bleached by heating to 110° C. and filtered through diatomaceous earth. When the dry and bleached lard had a temperature of 78° C., sufficient sodium propylene glycolate was added to produce a concentration of 1.3 per cent of the glycolate catalyst in the lard. After heating at 78° C. for 5 minutes, the lard exhibited the characteristic appearance and properties of crystal modified lard.

EXAMPLE XVI 1,500 grams of lard were dried and bleached by heating to 110° C. for a few minutes and filtered through diatomaceous earth. To the dry, bleached lard was added 2 per cent sodium benzyl alcoholate catalyst at a temperature of 84° C. After heating at the said temperature for 10 minutes, the lard had a characteristic appearance and properties of crystal modified lard.

EXAMPLE XVII 1,500 grams of prime steam lard which had been dried and bleached by heating for a few minutes at 110° C. and filtered through diatomaceous earth were heated to 150° C. and 2 per cent sodium octylate dissolved in xylene was added. After heating the lard at 150° C. for about 20 minutes, the lard exhibited the characteristic appearance and properties of crystal modified lard.

EXAMPLE XVIII 1,500 grams of prime steam lard which had been thoroughly dried by heating for several minutes at 110° C. and filtered through diatomaceous earth were heated to a temperature of 225° C. and 2.5 per cent sodium cetylate was dispersed uniformly throughout the heated lard. After heating for a period of 2 hours at a temperature of 225° C., the lard exhibited the characteristic appearance and properties of crystal modified lard as hereinbefore described.

EXAMPLE XIX 1,500 grams of prime steam lard which were thoroughly dried by heating several minutes at a temperature of 110° F. and filtered through diatomaceous earth were heated to a temperature of 200° C. and 2 per cent calcium glycerinate was added to the heated lard. After heating the lard at the said temperature for 2 hours with constant stirring, the lard exhibited the characteristic appearance and properties of crystal modified lard.

EXAMPLE XX 1,500 grams of thoroughly dried prime steam lard were filtered through diatomaceous earth and heated to a temperature of 200° C. To the heated lard was added 3 per cent sodium pentaerythritolate. After heating the lard for 60 minutes at a temperature of 200° C. with constant stirring, the treated lard exhibited the characteristic appearance and properties of crystal modified lard.

In each of the foregoing examples the per cent catalyst used was based on the weight of the lard being treated.

In order to determine suitable catalysts and optimum operating conditions for the herein-disclosed crystal modified treatment, it has been found necessary to employ one or more empirical tests. For example, it has been the practice to run a wet cream test, a water absorption test, and a pound cake baking test on the crystal modified lard or on the shortening comprising the crystal modified lard. By comparing the results of the foregoing tests on the treated lard with the result obtained on the control sample, it is possible to chart the course of the crystal modifying reaction and to determine when the crystal modifying treatment has taken place. Thus, when one observes a substantial decrease in the specific gravity of the lard-water emulsion in the wet cream test, a substantial increase in the amount of water which is taken up by the crystal modified material in the water absorption test, or an appreciable increase in the volume of a pound cake in the baking test, crystal modification will have taken place. Other tests based on the herein-disclosed characteristics of crystal modified lard may be conducted, such as taking Bloom consistency readings of the product being treated at temperatures above about 45° F., as the crystal modified product exhibits a substantially lower consistency between about 45° F. and the melting point of the product than does the unmodified lard at the same temperature.

While the foregoing wet cream test, water absorption test, and pound cake baking test are well known to those skilled in the art, the precise procedure employed in conducting these tests is as follows:

Wet cream test
FORMULA 530 grams confectionary sugar
414 grams shortening
56 grams water

METHOD

Have all ingredients at 75° F. Place these ingredients in a 10 quart mixing bowl of a Hobart C-10 machine or the equivalent. Mix for one-half minute at low speed. Scrape down the bowl and beater and then mix for five minutes at second speed. Weigh a representative 200 cc. portion of the creamed mass to obtain the specific gravity. Continue creaming at second speed, and take gravity readings again at 15 minutes and at 25 minutes. The bowl and beater should be scraped down after each gravity reading.

Total mixing time at second speed: 25 minutes
Gravity readings to be reported: 5, 15, and 25 minute intervals Convert weighings into specific gravity and report as grams per cc.

Water absorption test

Place one pound (454 grams) of shortening material at 75° F. into the 10 quart mixing bowl of the bench Hobart model C-10 or equivalent mixer. Mix for one-half minute at second speed. Scrape down bowl and beater. Water at 75° F. is then added by means of a mayonnaise oil dripping tank at the rate of 30 cc. per minute, the machine running continuously at second speed.

The machine should be stopped at intervals and the water shut off in order to inspect the mix for unemulsified droplets of water. During these inspections, the upper rim of the mix should be scraped down. When droplets of water are present on the surface of the beaten shortening material, the machine should be turned on and run for two minutes with the water shut off. If the droplets are still present, the test is completed. If the droplets are absorbed, more water should be added until the above procedure shows unemulsified droplets present.

To maintain a constant flow of water (30 cc. per minute) a constant level should be kept in the salad oil tank. Report the grams of water emulsified by 1 pound of the shortening material.

Pound cake baking test (without monoglycerides)
FORMULA

| | Lbs. | Ozs. |
|---|---|---|
| Group 1: | | |
| Shortening material (containing no monoglycerides) | 0 | 12 |
| Sugar | 1 | 8 |
| Flour (cake) | 0 | 12 |
| Salt | 0 | ¼ |
| Vanilla | 0 | ¼ |
| Milk | 0 | 5 |
| Group 2:[1] | | |
| Milk | 0 | 8 |
| Eggs | 0 | 12 |
| Group 3: Flour (cake) | 0 | 12 |

[1] Stir together well.

METHOD

Have all ingredients at 75° F.

Weigh the ingredients of group 1 into the 10-quart bowl of the bench Hobart model C-10 mixer, mix at first speed for 30 seconds and scrape down the bowl. (*Note.*—This is a preliminary mixing period and is not included in the following mixing times.)

Cream 2 minutes at second speed and scrape down the bowl.

Cream 2 more minutes at second speed, and again scrape down the bowl.

Cream at first speed for 1 minute, adding one-half of the ingredients of group 2 during the first 20 seconds. Add the ingredients of group 3 and cream 1 minute at first speed.

Cream 1 minute at first speed, adding the other one-half of the ingredients of group 2 during the first 20 seconds.

Scrape down and cream 5 minutes at first speed.

Take specific gravity of the batter and scale 510 grams of the batter into a standard, paper-lined loaf pan. Bake 65 to 70 minutes at 360° F. Allow cake to cool to room temperature before measuring.

Report volume of finished cake and specific gravity of batter; also consistency and appearance of batter.

Pound cake baking test (with monoglycerides)
FORMULA

| | Lbs. | Ozs. |
|---|---|---|
| Group 1: | | |
| Shortening material (containing monoglycerides) | 1 | 7 |
| Sugar, fine granulated | 2 | 7 |
| Salt | 0 | 1 |
| Flour (cake) | 2 | 0 |
| Group 2: | | |
| Milk | 1 | 0 |
| Vanilla | 0 | ½ |
| Group 3: Whole eggs | 1 | 7 |

METHOD

Have all ingredients at 75° F. Mix at first speed.

Scale the ingredients of group 1 into the 10-quart Hobart C-10 mixer bowl in the order given. Scale the ingredients of group 2 separately and pour into the bowl with the ingredients of group 1, starting the machine immediately, very slowly, so that the liquid and dry ingredients pick up without splashing. Mix for one-half minute and scrape down the bowl and beater. Mix for 3 minutes, not including the one-half minute interval at the beginning. Scrape down again and continue mixing for an additional 3-minute interval. Scrape down.

Add one-third of the eggs (75° F.) and mix 1 minute. Stop the machine and add one-third of the eggs. Mix another minute, then stop the machine. Add the final portion of the eggs, scrape down well, and continue mixing for 2 minutes to bring the total mixing time to 10 minutes. Take the specific gravity.

Scale 510 grams of the batter into a regulation paper-lined loaf pound cake pan and bake at 360° F. for 70 minutes. The maximum allowable variation in baking time should not exceed 5 minutes, depending on the load of the oven. Remove from the pan immediately after baking. Allow to cool to room temperature before measuring in the volumenometer.

a. Report specific gravity reading at 10 minutes in grams per cc.
b. Report batter temperature.
c. Report the cake volume in cc.
d. In addition, report such observations as consistency of the batter, appearance of the top crust and grain and texture of the cake.

The herein-described improved characteristics and properties of crystal modified lard make crystal modified lard particularly useful in the preparation of improved shortening products. Thus, any shortening product which has heretofore consisted of a substantial proportion of animal triglyceride material, such as lard, will be provided with very substantially improved baking and storage properties as well as improved appearance, particularly after holding at moderate or elevated temperatures by substituting crystal modified lard for all or part of the unmodified lard in the shortening. The resulting shortening products have been found to have the desirable properties characteristic of an all-vegetable shortening while retaining the superior shortening properties of lard.

The ability of crystal modified lard and compounded animal and animal-vegetable shortenings made therefrom which contain as little as 35 per cent crystal modified lard to retain their improved appearance and textural properties after prolonged storage and after storage under adverse conditions is an extremely important result of the present invention. Thus, even when the increase in the volume of a pound cake produced is considered only moderate as compared with the original lard shortening, it has been consistently observed that the lard treated in accordance with the herein-disclosed process and shortenings made therewith retain substantially their original desirable appearance, texture, and performance characteristics after a prolonged period of storage or after storage under adverse conditions, whereas the untreated lard and shortening products made therefrom lose their desirable characteristics in a relatively short time.

It has been found, for example, that a shortening product consisting of 85 per cent crystal modified lard and 15 per cent hydrogenated triglyceride material such as 50 and 60 titer hydrogenated lard or hydrogenated vegetable oils with or without monoglycerides being added will retain substantially its original appearance and most of its improved textural properties after being held at an elevated temperature such as 95° F. for a period of 8 weeks, whereas the shortenings containing untreated lard lose their original attractive appearance and much of their desirable textural properties after being held for 2 weeks under the above adverse conditions. The foregoing has been found to be true for all types of compounded animal shortenings and animal-vegetable shortenings and particularly where the shortenings contain added animal or vegetable hydrogenated fats to adjust the consistency thereof, with or without monoglycerides being added. Significantly, the improved result obtained with crystal modified lard are in no way dependent upon the presence of monoglycerides. The desirable properties imparted by the crystal modified lard are actually enhanced by deodorization treatment thereof prior to compounding.

Further evidence of the fundamental alteration of the crystal structure of the treated lard in accordance with the herein-disclosed process is found on examining the X-ray diffraction pattern of the treated lard. Thus, the X-ray diffraction pattern of a sample of the crystal modified lard shows that there has been a progressive reorientation of the crystal structure thereof during the treating period with secondary fundamental changes also occurring, making the crystal modified lard diffraction pattern resemble more closely that of vegetable shortening than the original untreated lard.

The foregoing has been found to be true in all types of compounded animal fat and animal-vegetable shortenings where the said shortenings contain added animal or vegetable hard fats and monoglycerides or are hydrogenated. Significantly, the improved results obtained with crystal modified lard are in no way dependent upon the presence of monoglycerides, since the desirable properties are enhanced by deodorization treatment.

The improved lard obtained in accordance with the herein-described invention can be used as an all-purpose shortening in place of both the animal and vegetable shortenings heretofore discriminately employed because of their peculiar properties. The improved lard may thus be advantageously employed in the manufacture of cakes and icings as well as in the preparation of bread and pie crust. Although we have illustrated the invention as being particularly applicable to baked goods, it is also applicable to other food products, such as the manufacture of candy and fried products. It is also understood that the improved fat may be advantageously used in lubricants, greases, cosmetics, medicated ointments, and in many other industrial applications.

This application is a continuation-in-part application of U. S. patent application Serial No. 183,666 filed September 7, 1950, which was a continuation-in-part application of U. S. patent application Serial No. 724,468, filed January 25, 1947.

Obviously, many modifications and variations of the invention as hereinbefore set forth may be made without departing from the spirit and scope thereof, and therefore only such limitations should be imposed as are indicated in the appended claims.

We claim:

1. In a process of treating lard to modify the same, the steps of contacting the lard with an interesterification catalyst selected from the group consisting of alkali metal alcoholates and alkaline earth metal alcoholates, and subjecting said lard while in contact with said catalyst and in liquid phase to an interesterification temperature for said catalyst to permanently modify the crystallizing properties of said lard, said treatment at said temperature being continued until the crystallizing properties of said lard are substantially completely modified and the solid constituents of said lard crystallize in stable form having an X-ray diffraction pattern resembling that of hydrogenated vegetable oil shortening and differing substantially from that of the unmodified lard.

2. In a process of treating lard to modify the same, the steps of contacting the lard with between about 0.2 and 2% by weight of sodium methylate and subjecting said lard while in contact with said sodium methylate and in liquid phase to a temperature between about 60° and 120° C. for a time between about 3 and 90 minutes, said treatment at said temperature being continued until the lard becomes reddish brown in color and the crystallizing properties of said lard are substantially completely modified and the solid constituents of said lard crystallize in stable form having an X-ray diffraction pattern resembling that of hydrogenated vegetable oil shortening and differing substantially from that of the unmodified lard.

3. In a process of treating lard to modify the same, the steps of contacting the lard with between about 0.2 and 2% by weight of sodium ethylate and subjecting said lard while in contact with said sodium ethylate and in liquid phase to a temperature between about 60° and 120° C. for a time between about 3 and 90 minutes, said treatment at said temperature being continued until the lard becomes reddish brown in color and the crystallizing properties of said lard are substantially completely modified and the solid constituents of said lard crystallize in stable form having an X-ray diffraction pattern resembling that of hydrogenated vegetable oil shortening and differing substantially from that of the unmodified lard.

4. In a process of treating lard to modifying the same, the steps of contacting the lard with between about 0.2 and 0.5% by weight of sodium methylate and subjecting said lard while in contact with said sodium methylate and in liquid phase to a temperature between about 70° and 100° C. for a time between about 3 and 30 minutes, said treatment at said temperature being continued until the lard becomes reddish brown in color and the crystallizing properties of said lard are substantially completely modified and the solid constituents of said lard crystallize in stable form having an X-ray diffraction pattern resembling that of hydrogenated vegetable oil shortening and differing substantially from that of the unmodified lard.

5. In a process of treating lard to modify the same, the steps of contacting the lard with an alkaline reacting interesterification catalyst, and subjecting said lard while in contact with said catalyst and in liquid phase to an interesterification temperature for said catalyst to permanently modify the crystallizing properties of said lard, said treatment at said temperature being continued until the lard becomes reddish brown in color and the crystallizing properties of said lard are substantially completely modified and the solid constituents of said lard crystallize in stable form having an X-ray diffraction pattern resembling that of hydrogenated vegetable oil shortening and differing substantially from that of unmodified lard.

KARL F. MATTIL.
DE WITTE NELSON.

REFERENCES CITED

The following references are of record in the file of this patent:

UNITED STATES PATENTS

| Number | Name | Date |
| --- | --- | --- |
| 2,378,007 | Eckey | June 12, 1945 |
| 2,442,532 | Eckey | June 1, 1948 |
| 2,442,536 | Eckey | June 1, 1948 |
| 2,442,537 | Eckey | June 1, 1948 |
| 2,571,315 | Vander Wal et al. | Oct. 16, 1951 |